July 15, 1952 C. L. CLAWSON 2,602,997
DENTURE
Filed April 17, 1950

INVENTOR.
Claude L. Clawson
BY
Marcus Lothrop
ATTORNEY

Patented July 15, 1952

2,602,997

UNITED STATES PATENT OFFICE 2,602,997

DENTURE

Claude L. Clawson, El Cerrito, Calif.

Application April 17, 1950, Serial No. 156,462

4 Claims. (Cl. 32—2)

My invention relates to restorative dentistry and is especially concerned with a set of dentures in which manufactured teeth are arranged in a number of variant ways functionally to approximate natural conditions, and as especially indicated for a particular user and in which sound mechanical principles of holding and supporting and fixing the simulated teeth are observed and in which a pleasing or appropriate appearance of the denture is achieved.

In the present practice of restorative dentistry, it is customary to replace fourteen upper teeth and fourteen lower teeth in full edentulous areas. Normally the replacement teeth are arranged individually in a suitable base in accordance with general principles of restoring, in so far as possible, proper functioning and of affording an appropriate appearance.

It is an object of my invention to provide an improved denture.

Another object of my invention is to provide a denture having a close approximation of a natural appearance.

Another object of my invention is to provide a denture in which the various forces imposed upon the simulated teeth are met and handled in a fashion for a strong, comfortable and permanent denture.

Another object of my invention is to provide a denture the parts of which can readily be assembled to simulate any one of a wide variety of dental conditions so that in a simple fashion there may be produced a denture closely approximating the optimum conditions for the particular individual user.

Other objects, together with the foregoing, are attained in the embodiment of my invention described in the accompanying description and illustrated in the accompanying drawings in which Figure 1 is a plan of an upper denture constructed in accordance with my invention.

Figure 1:
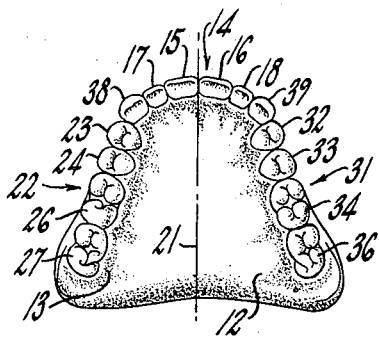

While the denture of my invention is capable of embodiment in a number of different ways and is subject to numerous variations within the scope of the claims, it has successfully been embodied as shown herein. In this arrangement I provide a base 12 of any of the customary kinds shaped appropriately for the adjacent surfaces of the oral cavity and to have a generally U-shaped ridge 13 on and in which simulated teeth are disposed and anchored.

The upper and lower sets of teeth are treated in substantially the same way so the illustration and description of one applies to the other as well. In especial accordance with my invention I do not provide individual simulated teeth for the entire upper (or lower) set but rather provide a central block 14 of simulated teeth, in this instance the tooth block including the two (right and left) central teeth 15 and 16 and the two (right and left) lateral teeth 17 and 18. Since these are simulated in a single block, their construction is integral and any force exerted upon any one of the teeth is borne by all of the teeth in the block. The stability of the block is therefore far greater than the stability of any individual tooth.

Figure 2:
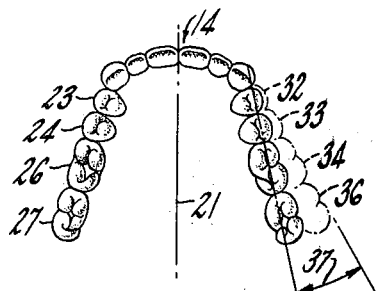
Figure 2 is a plan similar to Figure 1 but illustrating variations in position of parts of the denture.
Figure 3:
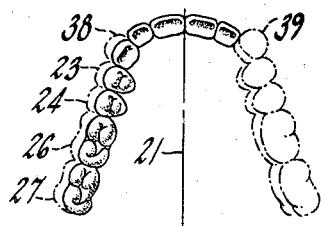
Figure 3 is a plan similar to Figure 1 but illustrating other variations in position.
Figure 4:
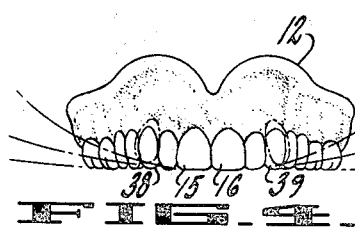
Figure 4 is a front elevation of an upper denture constructed in accordance with my invention illustrating various positions of the parts.

It is possible, furthermore, to make the central block 14 of an arch curvature such that it fits well into a wide variety of dental arches. Varying block sizes and shapes permit close approximation of all conditions. As illustrated in Figures 2 and 3 particularly, the central arch 14 is symmetrical with respect to a median plane 21 despite variations in curvature in the dental arches. As illustrated in Figure 4, the central block 14 is readily positionable so as to present a substantially normal appearance and mounting for any one of a large number of different curvatures. This point is further emphasized in Figures 5, 6 and 7 in which the central block 14U for the upper teeth is variably positionable with respect to the central block 14L for the lower teeth, each of the blocks being represented diagrammatically by the outline of a single tooth.

Figure 5:
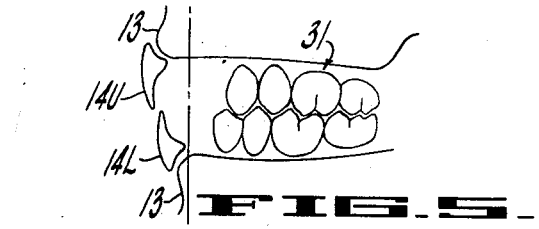
Figure 5 is a side elevation, several simulated teeth being omitted, showing one arrangement of my denture.
Figure 6:
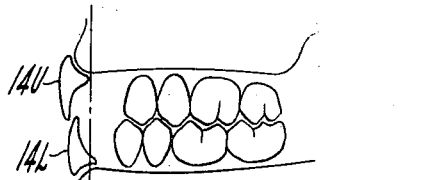
Figure 6 is a view comparable to Figure 5 but showing a different arrangement.
Figure 7:
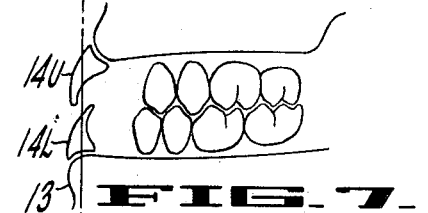
Figure 7 is a view comparable to Figure 5 but showing a still different arrangement.

If the mandibular teeth are retrusive as shown in Figure 5, the central blocks 14U and 14L are arranged relative to each other so that the entire central tooth groups are still opposed functionally. Somewhat comparably, as shown in Figure 6, in the event the relation of the teeth is substantially normal the central blocks 14U and 14L are appropriately rotated with respect to the supporting and confining ridge 13 to afford a normal opposition. As illustrated in Figure 7, in the event there are normally protrusive mandibular teeth the blocks 14U and 14L are correspondingly rotated as units with respect to their particular ridges 13 in order to afford an approximation of the natural teeth to a very close degree.

In a comparable fashion I provide an upper (or lower) side block 22 comprising the first bicuspid 23, the second bicuspid 24, the first molar 26, and the second molar 27. All of these simulated teeth are integrally formed in one block so that the force upon one of them is borne and supported by all of them. Similarly, on the other side of the dental arch I provide an upper (or lower) side block 31 comprising first and second bicuspids 32 and 33 and first and second molars 34 and 36. The side blocks 22 and 31 especially as shown in Figures 2 and 3 are movable in a rotary fashion, as illustrated by the arrows 37, to conform to wide or narrow or normal dental arches. In effect the blocks swing about a center in the general area of the adjacent one of the cuspids 38 and 39. They can also be moved bodily in any direction, as shown by the dotted lines in the left half of Figure 3.

When the blocks 22 and 31 are moved into various rotated positions about the cuspids 38 and 39 as pivot areas, they are elongated or shortened in effect with respect to the general dimensions of the dental arch. If this discrepancy or difference becomes serious, it is corrected by the use of side blocks 22 and 31 of different dimensions, as shown in the right half of Figure 3. For various dental arches, various sizes of blocks are provided and by an appropriate assembly of these it is possible to simulate quite closely the original denture and to provide a replacement which is a close approximation of the natural condition. This is all accomplished with greater than usual strength since the teeth are arranged for the most part in massive integral blocks so that the forces upon them are well met and distributed. The appearance is entirely satisfactory and affords a close approximation of the ideal.

Figure 8:
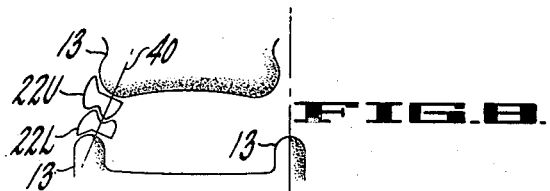
Figure 8 is a transverse diagram showing one relative position of the parts in my denture.
Figure 9:
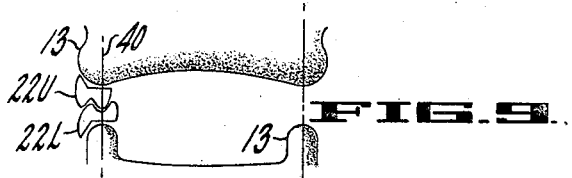
Figure 9 is a view similar to Figure 8 but showing the parts in a different position.
Figure 10:
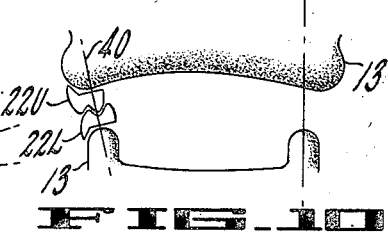
Figure 10 is a view similar to Figure 8 but showing the parts in a still different position.

The side block 22U for the upper teeth and the side block 22L for the lower teeth, especially as shown in Figure 8, are also rotatable as a unit about their respective ridges 13 so that they are disposed in an approximation of the natural opposition. For example, as shown in Figure 8, when the lower ridge is wider than the upper ridge, the respective blocks are set so that their approximate axis 40 is correct for proper occlusion. In an instance when the upper ridge is of approximately the same width as the lower ridge, the various blocks 22U and 22L are arranged so that their axis 40 is in approximately the normal position. Quite comparably, as shown in Figure 10, when the lower ridge is narrower than the upper one, the side blocks 22U and 22L are rotated with respect to the ridges 13 so that their axis 40 is approximately in the normal position. By setting only two upper and two lower posterior blocks I have appropriately oriented for functioning occlusal plane and proper relation to the ridges, the most important masticating and milling surfaces of the dentures.

After the central block 14 and the side blocks 22 and 31 are appropriately oriented not only for proper mechanical positioning but also for an attractive appearance, I then position the upper (or lower) right and left cuspids 38 and 39 in the base 12 in such a fashion that the cuspids are in effect transition teeth. The cuspid shape lends itself to that function rather naturally and as especially shown in Figures 2 and 3, for example, when the side blocks 22 and 31 are narrowly positioned or widely positioned, the cuspids 38 and 39 are appropriately shifted so that they effect a smooth transition between the general direction of the other simulated teeth in the blocks. That not only affords an appropriate occlusion for the user but likewise provides a smooth transition in appearance. Particularly as illustrated by dotted lines in Figure 4, the cuspids 38 and 39 are positionable to take care of a rotation of the side blocks 22 and 31 so that there is general alignment with the central block 14 in any of the positions indicated.

While the cuspids have been omitted from the showing in Figures 5, 6 and 7 in order more clearly to illustrate the blocks, they are inserted in the spaces available in a fashion to equalize the general differences in position between the central block and the two side blocks. The cuspids are the only single teeth utilized in this arrangement. A complete denture for one ridge includes a central block and two side blocks appropriately located and two cuspids arranged between the central block and the adjacent side blocks in a fashion to serve as a general continuation or transition between the blocks as positioned.

Once the blocks and cuspids have been arranged appropriately, they are held firmly in the base by the usual technique.

What is claimed is:

1. A denture comprising a base carrying a single central integral block formed to represent two central and two lateral teeth all joined to each other, a pair of oppositely disposed side integral blocks each formed to represent first and second bicuspid and first and second molar teeth all joined to each other, and a pair of separate members each formed to represent a cuspid and each disposed between said central block and one of said side blocks.

2. A denture comprising a base carrying a single central integral block formed to represent two central and two lateral teeth all joined to each other and disposed in a selected position on said base, a pair of oppositely disposed side integral blocks each formed to represent first and second bicuspid and first and second molar teeth all joined to each other and disposed in a selected position on said base, and a pair of separate members each formed to represent a cuspid and each disposed between said central block and one of said side blocks in a position intermediate the selected position of said central block and the selected position of the adjacent side block.

3. A denture comprising a base in the shape of a ridge curved to represent a dental arch and carrying a single central block formed to represent two central and two lateral teeth all joined to each other and disposed in a selected position on said base to simulate an optimum natural position for said teeth, a pair of oppositely disposed side blocks each formed to represent first and second bicuspid and first and second molar teeth all joined to each other and disposed in a selected position on said base to simulate an optimum natural position for said teeth, and a pair of members each formed to represent an individual cuspid and disposed in a position on said base to establish a smooth transition from said central block to the adjacent side blocks.

4. A denture comprising a base in the shape of a ridge curved to represent a dental arch and carrying a single central integral block formed to represent two central and two lateral teeth all joined to each other and disposed in a central position on said base to simulate an optimum natural position for said teeth, a pair of oppositely disposed side integral blocks each formed to represent first and second bicuspid and first and second molar teeth all joined to each other and disposed in a lateral position on said base to simulate an optimum natural position for said teeth, and a pair of individual members each formed to represent a cuspid and disposed in a position on said base between said integral central block and said integral side blocks to establish a smooth transition from said central block to the adjacent side blocks.

CLAUDE L. CLAWSON.

REFERENCES CITED

The following references are of record in the file of this patent:

UNITED STATES PATENTS

| Number | Name | Date |
|---|---|---|
| 2,279,067 | Shapiro | Apr. 7, 1942 |
| 2,419,248 | Blanchard | Apr. 22, 1947 |